Sept. 7, 1943.  J. E. SNYDER ET AL  2,328,751
COOKING
Filed May 3, 1941
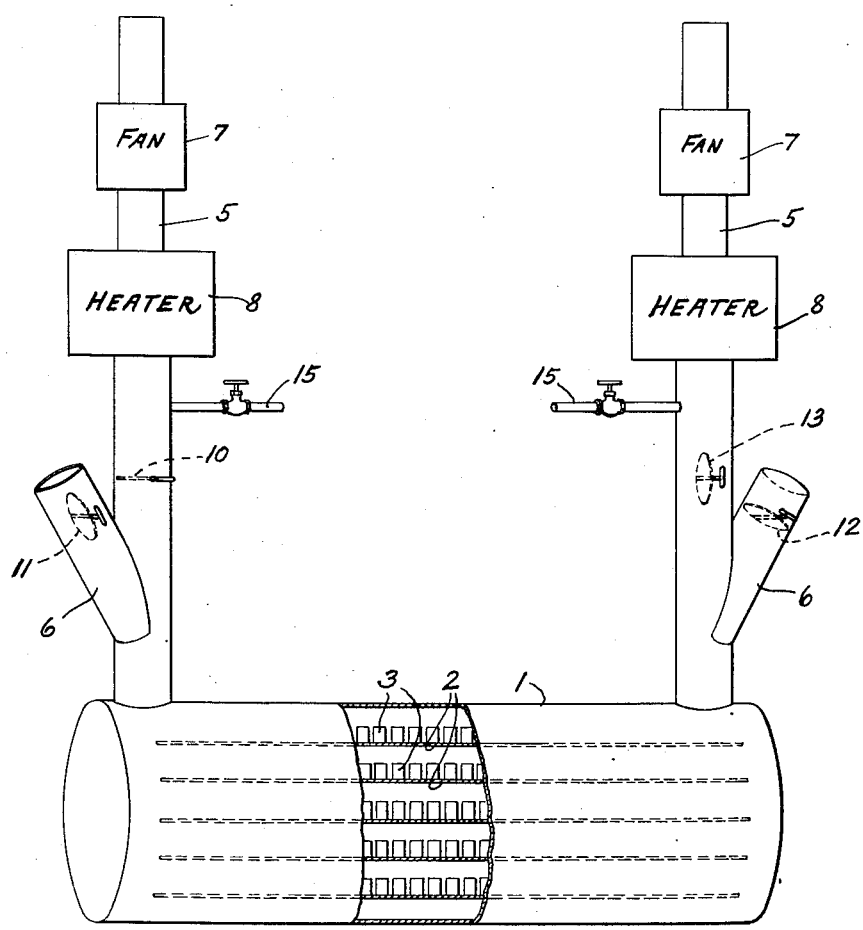
Inventors
James E. Snyder and
Chester J. Cavallito
Attorney

UNITED STATES PATENT OFFICE 2,328,751

COOKING

James E. Snyder, Akron, and Chester J. Cavallito, Cuyahoga Falls, Ohio, assignors to Wingfoot Corporation, Wilmington, Del., a corporation of Delaware Application May 3, 1941, Serial No. 391,750

2 Claims. (Cl. 53—20)

This invention relates to cooking materials under pressure in an air-tight container which is not pressure resistant. The container may for example be a bag of rubber hydrochloride film or the like. It may be a bag of regenerated cellulose or other cellulosic material suitably coated on the interior. The container may, for example, be a bag or other structure made of paper, chip board or the like, which is suitably coated on the interior or both the interior and exterior. The coating may, for example, be formed of a polyvinyl derivative or any suitable natural or synthetic coating material. The package is one which will burst when subjected to a pressure differential within and without the package of up to ten pounds per square inch.

According to this invention the heat for cooking is supplied by air under pressure. The air may be heated to the necessary temperature before entering the pressure vessel and then after circulating through the vessel it may be exhausted. It may be reheated and reused. Preferably the heater is supplied with heating means and the air is continuously circulated in the chamber under pressure to convey the heat from the heating means to the material being cooked.

The material being cooked may be a foodstuff for human consumption or may be dog food or the like. The process is applicable to the cooking of fruits, vegetables, meats, seafoods, soups, juices, jellies, puddings, etc. The foods may be raw or partially pre-cooked when subjected to the cooking process of this invention.

The vessel is maintained under such pressure during cooking that the gases and vapors thereby developed within the container do not rupture the container. Any usual cooking temperature, for example any temperature above that of boiling water up to 240 or 250° F. or more may be used for cooking. The temperature employed will depend upon the material being cooked, etc.

The packages are preferably held in a form during cooking so that they do not get out of shape. A metal box with a loosely fitting cover is suitable for this purpose. Many packages, each in a suitable form, may be cooked simultaneously in the same vessel. The vessel may be provided with trays, and the containers are preferably arranged in the vessel so that no two containers are touching, thus providing for circulation of the hot air around all sides of each package and the most advantageous conditions for transfer of heat from the air to the packages.

All of the heat used for heating the packages and cooking their contents may be contained in the air as it enters the pressure vessel. In this case heated air will be supplied to the vessel throughout the cooking period and the preliminary heating period in which the vessel and contents are brought to the cooking temperature. Air of lower temperature will be withdrawn from the vessel throughout the heating and cooking operations. Baffling means must be provided in the vessel to guide the circulation of air and provide for efficient heat transfer from the air to all of the packages. The shelves on which the packages are arranged may serve as guides for the air circulation. For example, the heated air may all be introduced at one end of the vessel, evenly distributed between the passageways into which the vessel is divided by the shelves, and withdrawn from the other end of the vessel. After a certain interval the direction of the air circulation may then be reversed.

The invention will be further described in connection with the accompanying drawing which shows in perspective a vessel equipped for carrying out the invention.

The vessel 1 is equipped with shelves 2 on which the packages 3 are arranged, or the vessel may be provided with guides on which trays, the equivalent of the shelves 2, may be easily slid into the vessel and slid out again after completion of the cooking.

Each end of the vessel is equipped with a duct 5 for introducing air into the vessel and a duct 6 for leading the exhaust air from the vessel. Each duct 5 is equipped with a fan 7 for supplying the air and a heater 8 for heating the air. Valves 10, 11, 12 and 13 control the passage of air within the ducts. By manual operation, or preferably by automatic means, the direction of the passage of the air through the vessel may be reversed every few minutes, for example every 3 or 5 or 10 minutes. As a result the contents of all the packages is cooked to the same degree.

For example, when the valve 10 is open the valve 12 will be open and the valves 11 and 13 closed. The extent to which the valve 12 is opened will be controlled to maintain the vessel under the desired pressure. The temperature of the heater 8 will be automatically controlled, as by the exit gases, to maintain the desired temperature within the vessel. The whole heating arrangement may be controlled so as to maintain different temperatures within the vessel at different stages of the operation.

After a predetermined period of time the valves 10 and 12 are closed and the valves 11 and 13 opened and the control of the operation is maintained as above explained.

Means for opening and closing the vessel is not shown. One or both of the end plates are advantageously hinged so that they may be swung open to gain access to the interior of the vessel.

After the cooking is completed the vessel and contents may be cooled by blowing cold air into it, first at one end, and then at the other, and the rate of exhaust of the gases will be so controlled that the exterior temperature and pressure are reached without the pressure within the vessel falling sufficiently below the pressure within the packages to cause the packages to burst.

To hasten the cooling, a fine spray or mist of water may be introduced into the air as it enters the vessel. Water supply pipes 15 are shown for this purpose. To maintain approximately uniform conditions throughout the vessel the cold air and water will be first introduced at one end of the vessel and then the other intermittently throughout the cooling period. On absorbing heat in the vessel some of the water will be vaporized. The pressure in the vessel must be carefully controlled. This will be done by regulating the amount to which the exhaust valve 11 or 12 is open, and this will preferably be done by automatic means controlled by a pressure measuring device within the vessel.

As an alternative method of heating with air, the vessel may contain heating units which heat the air as it passes over them. These heating units may, for example, be electrically heated, or they may be heated by steam. For example, steam pipes may pass across the path traveled by the air. Electrical heating units may be preferred because their temperature may be more accurately controlled.

When heating means is included in the vessel substantially the same air will be continuously recirculated within the vessel. It may be desirable to introduce a small amount of fresh air into the vessel and to bleed a small amount of air from the vessel at all times and by controlling the amount of air which escapes control the pressure within the vessel. The circulation of the air in the vessel may be aided by fans strategically located. The vessel may, for example, be divided horizontally into two sections of approximately the same size and the air may be continually driven over the packages in the upper part of the vessel in one direction, and in the lower part in the opposite direction; and the direction of the air circulation may be reversed at intervals. The fans used for circulation may advantageously be so located as to direct the air from them on to the heating units to insure efficient transfer of heat to the air.

What we claim is:

1. The method of cooking in a package which will burst when subjected to a pressure differential of up to ten pounds per square inch within and without the package, which comprises cooking in the package and supplying the heat for cooking by air which is circulated around the package under pressure sufficient to maintain the differential in pressure within and without the package below that at which the package will burst and after the cooking is completed cooling the package while still under such pressure by bringing air of lower temperature in contact therewith.

2. The method of cooking in a package which will burst when subjected to a pressure differential of up to ten pounds per square inch within and without the package, which comprises cooking in the package and supplying the heat for cooking by air which is circulated around the package under pressure sufficient to maintain the differential in pressure within and without the package below that at which the package will burst and after the cooking is completed cooling the package while still under such pressure by transferring heat from the package to air which contains liquid water.

JAMES E. SNYDER.
CHESTER J. CAVALLITO.